3,324,153
12β-HYDROXY-Δ¹,³,⁵⁽¹⁰⁾-ESTRATRIENES AND THEIR METHOD OF PREPARATION

Samuel C. Pan, Metuchen, Leonard J. Lerner, New Brunswick, Pacifico A. Principe, South River, and Barbara Junta, Somerset, N.J., assignors to E. R. Squibb & Sons, Inc., New York, N.Y., a corporation of Delaware
No Drawing. Filed Oct. 21, 1965, Ser. No. 500,291
6 Claims. (Cl. 260—397.45)

This invention relates to and has for its object the provision of an improved process for preparing 12β-hydroxy-Δ¹,³,⁵⁽¹⁰⁾-estratrienes and to the new steroids formed thereby.

It has been found that a 19-nor-Δ⁴-androstene may be converted to a 12β-hydroxy-Δ¹,³,⁵⁽¹⁰⁾-estratriene derivative in high yield by a two-step process without any substantial formation of undesired by-products. In essence, therefore, the process of this invention entails subjecting a 19-nor-Δ⁴-androstene to the action of enzymes of a 12β-hydroxylating microorganism, whereby a corresponding 12β-hydroxy-19-nor-Δ⁴-androstene derivative is formed; and subjecting the latter to the action of enzymes of a 1-dehydrogenating microorganism, to yield the desired 12β-hydroxy-Δ¹,³,⁵⁽¹⁰⁾-estratriene final product.

Among the suitable starting steroids are included any of the 19-nor-Δ⁴-androstenes. The preferred starting steroids, however, are the 3,17-dioxygenated-19-nor-Δ⁴-androstenes, such as 19-nor-Δ⁴-androstene-3,17-dione, 19-nortestosterone, 19-nor-17α-methyltestosterone and 19-nor-17α-ethynyltestosterone.

In the first step of the process of this invention, the steroid substrate is subjected to the action of enzymes of a 12β-hydroxylating microorganism, the reaction being carried out in the usual manner by culturing the microorganism in the presence of the steroid, or by treating the steroid with non-proliferating cells of the microorganism, or by intermixing the steroid with 12β-hydroxylating enzymes previously obtained from the microorganism. The conditions for such microbial reaction are well known in the art and are similar to those specified in U.S. Patent 3,179,698.

Any 12β-hydroxylating microorganism can be used as the source of the 12β-hydroxylating enzyme. Such microorganisms include, inter alia, *Diplodia natalensis*, *Caldariomyces fumago*, *Corticium microsclerotia*, *Calonectria decora*, *Coniothyrium hellebori* and *Colletotrichum derridis*.

The process results in the preparation of the 12β-hydroxy-19-nor-Δ⁴-androstene intermediates. The preferred intermediates are the 12β-hydroxy-3,17-dioxygenated-19-nor-Δ⁴-androstenes, such as 19-nor-Δ⁴-androstene-12β-ol-3,17-dione, 12β-hydroxy-19-nortestosterone, 12β-hydroxy-19-nor-17α-methyltestosterone, and 12β-hydroxy-19-nor-17α-ethynyltestosterone.

These 12β-hydroxy-19-nor-Δ⁴-androstenes are then subjected to the action of enzymes of 1-dehydrogenating microorganisms, to yield the desired 12β-hydroxy-Δ¹,³,⁵⁽¹⁰⁾-estratriene final products, the reaction being carried out in the usual manner by culturing the microorganism in the presence of the steroid, or by treating the steroid with non-proliferating cells of the microorganism, or by intermixing the steroid with 1-dehydrogenating enzymes previously obtained from the microorganisms. Optimally the dehydrogenation is conducted with cell-free extracts of 1-dehydrogenating microorganisms, as by the method and with the enzymes described in U.S. Patent No. 3,047,469.

The second step of the process results in the formation of the final products, namely the 12β-hydroxy-Δ¹,³,⁵⁽¹⁰⁾-estratriene derivatives, which are new compounds of this invention and include the 12β-hydroxy-3,17-dioxygenated-Δ¹,³,⁵⁽¹⁰⁾-estratrienes, such as 12β-hydroxyestrone, 12β-hydroxyestradiol, 12β-hydroxy-17α-methylestradiol and 12β-hydroxy-17α-ethynylestradiol. These final products are useful as estrogenic agents, being used for the same purpose and in the same manner as estrone.

The following examples illustrate the invention (all temperatures being in centigrade):

*Example 1.—12β-hydroxy-19-nor-Δ⁴-androstene-3,17-dione*

A. *Fermentation.*—Surface growth from each of three 10-day old agar slant cultures of *Diplodia natalensis* (ATCC 9055), the slant containing as a nutrient medium (A):

| | Grams |
|---|---|
| Glucose | 10 |
| Yeast extract | 2.5 |
| K₂HPO₄ | 1 |
| Agar | 20 |
| Distilled water to 1 liter. | | is suspended in 5 ml. of a 0.01% sodium lauryl sulfate aqueous solution. One ml. portions of the suspension are used to inoculate ten 250 ml. conical flasks, each containing 50 ml. of the following sterilized medium (B):

| | Grams |
|---|---|
| Dextrose | 10 |
| Corn steep liquor | 6 |
| NH₄H₂PO₄ | 3 |
| Yeast extract | 2.5 |
| CaCO₃ | 2.5 |
| Distilled water to 1 liter. | |

After 72 hours of incubation at 25° with continuous rotary agitation (280 cycles per minute; 2 inch stroke), 10% (vol./vol.) transfers are made to forty 250 ml. conical flasks each containing 50 ml. of freshly sterilized medium B plus 500 micrograms/ml. of 19-nor-Δ⁴-androstene-3,17-dione. The steroid is added by supplementing each flask with 0.25 ml. of a sterile solution of the steroid in N,N-dimethylformamide containing 100 mg./ml. of steroid. A total of 1.0 gram is used. After 7 days of further incubation, the contents of the flasks are pooled through a Seitz clarifying pad. The flasks, mycelium and pads are washed with successive 50 ml. portions of warm water. The combined filtrate and washings have a volume of 2,100 ml.

B. *Isolation and characterization.*—The combined filtrate and washings (2,100 ml.) are extracted three times with 400 ml. portions of methyl isobutyl ketone. The combined methyl isobutyl ketone extracts are washed with water, dried over anhydrous sodium sulfate and concentrated to dryness under vacuum, leaving 400 mg. of crude product. This material is chromatographed on a thin layer of Silica Gel GF (Merck) with chloroform containing 5% (by volume) methanol as the developing solvent. The UV-absorbing band which moves with approximately 7/10 mobility of the substrate, 19-norandrostenedione, is eluted with a 1:1 (by volume) mixture of methanol and chloroform. After evaporating off the solvent, the residue is partitioned between chloroform and a 1:1 (by volume) mixture of water and methanol. The chloroform phase, upon evaporation under vacuum to dryness, yields crystalline 12β-hydroxy-19-nor-Δ⁴-androstene-3,17-dione. It recrystallized from acetone-hexane to yield about 88 mg. of the pure product, M.P. about 185–188°; [α]$_D$ +121° (chloroform).

*Example 2*

Following the procedure of Example 1, but substituting *Colletotrichum derridis* (CBS) (Central Bureau voor Schimmelcultures, Baarn, Netherlands) for the *Diplodia natalensis*, the 12β-hydroxy-19-nor-Δ⁴-androstene-2,17-dione crystallizes directly from the chloroform extract upon evaporation without purification by the thin layer chromatography. The yield is 730 mg.

*Example 3*

Following the procedure of Example 1, but substituting *Caldariomyces fumago* ATCC–11925 for the Diplodia, 12β-hydroxy-19-nor-Δ⁴-androstene-3,17-dione is obtained.

Similarly, by following the procedure of Example 1, but substituting the following microorganisms for the Diplodia used in the example, 12β-hydroxy-19-nor-Δ⁴-androstene-3,17-dione is obtained: *Corticium microsclerotia* NRRL–2727, *Calonectria decora* ATCC–14767 and *Coniothyrium hellebori* ATCC–12522.

Moreover, by substituting the following steroid substrates the 19-nor-Δ⁴-androstene-3,17-dione in the procedure of Example 1, the indicated product is obtained.

| Steroid substrate: | Product |
| --- | --- |
| 19-nor-17α-methyltestosterone | 12β-hydroxy-19-nor-17α-methyltestosterone. |
| 19-nor-17α-ethynyltestosterone | 12β-hydroxy-19-nor-17α-ethynyltestosterone. |
| 19-nortestosterone | 12β-hydroxy-19-nortestosterone. |

*Example 4.—12β-hydroxyestrone by growing culture of* Corynebacterium simplex

A. *Fermentation.*—Surface growth from a two-week old agar slant of *Corynebacterium simplex* (ATCC 6946), the slants containing as a nutrient medium (A):

|  | Grams |
| --- | --- |
| Glucose | 10 |
| Yeast extract | 2.5 |
| K₂HPO₄ | 1 |
| Agar | 20 |
| Distilled water to 1 liter. | | is suspended in 5 ml. of 0.01% aqueous sodium lauryl sulfate solution. One ml. portions of this suspension are used to inoculate four 250 ml. Erlenmeyer flasks, each containing 50 ml. of the following sterilized medium (B):

|  | Grams |
| --- | --- |
| Beef extract | 1.5 |
| Yeast extract | 3 |
| Peptone | 6 |
| Dextrose | 1 |
| Distilled water to 1 liter. | |

After 24 hours of incubation at 25° with continuous rotary agitation (280 cycles/minute; 2 inch stroke), 5% (vol./vol.) transfers are made to eight 250 ml. Erlenmeyer flasks each containing 50 ml. of freshly sterilized medium B. After 24 hours of further incubation, using the same conditions as described above, the steroid (500 micrograms/ml.) is added by supplementing each flask with 0.25 ml. of a sterile solution (100 mg./ml.) of 12β-hydroxy-19-nor-Δ⁴-androstene-3,17-dione in N, N-dimethylformamide. A total of 200 mg. is fermented. After 48 hours of further incubation, using identical conditions as described above, the contents of the flasks are pooled, and the broth is extracted three times with 200 ml. portions of methyl isobutyl ketone. Upon evaporation of the combined extract under vacuum to dryness, crystalline 12β-hydroxyestrone is obtained. It is recrystallized twice from acetone-hexane to yield about 180 mg. of the pure product, M.P. about 279–281°; $[\alpha]_D^{23}$ +107° (C. 0.22, 95% ethanol).

*Example 5.—12β-Hydroxyestrone by cell-free enzyme preparation from* Corynebacterium simplex Following the procedure of Example 4 with the exception that no 12β-hydroxy-19-norandrostenedione is added, the cells of the culture of *Corynebacterium simplex* are harvested at the end of 72 hours by centrifugation for 10 minutes at 2000× G. The supernatant is decanted off and the cells are placed in a mortar along with an equal amount by weight of alumina (finely powdered) and treated in a Raytheon magneto-strictive oscillator for 20 minutes. The sonicated mixture is centrifuged for 10 minutes at 2000× G to remove the cell debris and alumina.

12β-hydroxy-19-norandrostenedione (1 mg.), 2,6-dichlorophenol indophenol (500 μg.) or other hydrogen acceptor, such as 2-methylnaphthoquinone and 2.0 ml. of the cell-free ring A dehydrogenase preparation, described above, are placed in a test tube and brought to a volume of 5.0 ml. with a 0.03 M sodium phosphate buffer. The mixture is allowed to stand for one hour at 30° C. after which it is twice extracted with 1 ml. of methyl isobutyl ketone. The combined extract is chromatographed on paper using ethylene glycol as the stationary phase and a mixture of equal volumes of benzene and chloroform as the mobile phase. A spot moving with the same $R_f$ (0.38) and exhibiting the same characteristic color reactions as the 12β-hydroxyestrone obtained in Example 4 is observed.

Similarly, by following the procedures of Examples 4 or 5, but substituting 12β-hydroxy-19-nor-17α-methyltestosterone, 12β-hydroxy-19-nor-17α-ethynyltestosterone, and 12β-hydroxy-19-nor-testosterone for the 12β-hydroxy-19-nor-Δ⁴-androstene-3,17-dione, the corresponding 12β-hydroxy-Δ¹,³,⁵⁽¹⁰⁾-estratriene derivatives are obtained.

Similarly, by substituting the following 1-dehydrogenating microorganisms for the *Corynebacterium simplex* in Examples 4 and 5, the same products are formed: *Nocardia restrictus* ATCC–14887, *Pseudomonas testosteroni* ATCC–11996, *Cylindrocarpon radicicola* ATCC–11011, and *Mycobacterium rhodochrous* ATCC–4277.

The invention may be variously otherwise embodied within the scope of the appended claims.

What is claimed is:

1. A process for preparing a 12β-hydroxy-19-nor-Δ⁴-androstene, which comprises subjecting a 19-nor-Δ⁴-androstene to the action of enzymes of *Diplodia natalensis*.

2. The process of claim 1, wherein the androstene is a 3,17-dioxygenated-19-nor-Δ⁴-androstene.

3. The process of claim 1, wherein the androstene is 19-nor-Δ⁴-androstene-3,17-dione.

4. A steroid selected from the group consisting of 12β-hydroxyestrone, 12β-hydroxyestradiol, 12β-hydroxy-17α-methylestradiol and 12β-hydroxy-17α-ethynylestradiol.

5. 12β-hydroxyestrone.

6. 12β-hydroxyestradiol.

References Cited

UNITED STATES PATENTS 2,960,436   11/1960   Thoma et al. _____ 195—51

OTHER REFERENCES

De Flines et al.: Rec. Trav. Chim., 82, pages 139–142 (1963).

J. Amer. Chem. Soc. 82, 5575–5584 (1960).

Kushinsky: J. Biol. Chem., 230, pages 31–39 (1958).

LEWIS GOTTS, *Primary Examiner.*

T. M. MESHBESHER, *Assistant Examiner.*